(12) United States Patent
Caldwell

(10) Patent No.: US 11,578,386 B2
(45) Date of Patent: Feb. 14, 2023

(54) METAL REFINEMENT

(71) Applicant: Enviro Metals, LLC, Thonotosassa, FL (US)

(72) Inventor: David W. Caldwell, Thonotosassa, FL (US)

(73) Assignee: ENVIRO METALS, LLC, Thonotosassa, FL (US)

( * ) Notice: Subject to any disclaimer, the term of this patent is extended or adjusted under 35 U.S.C. 154(b) by 0 days.

(21) Appl. No.: 17/705,304

(22) Filed: Mar. 26, 2022

(65) Prior Publication Data
US 2022/0213575 A1 Jul. 7, 2022

Related U.S. Application Data

(63) Continuation of application No. 17/405,837, filed on Aug. 18, 2021, now Pat. No. 11,319,613.

(60) Provisional application No. 63/067,275, filed on Aug. 18, 2020.

(51) Int. Cl.
| | |
|---|---|
| *C22B 11/06* | (2006.01) |
| *C22B 11/00* | (2006.01) |
| *B22F 9/24* | (2006.01) |
| *C22B 3/22* | (2006.01) |
| *B22F 9/08* | (2006.01) |

(52) U.S. Cl.
CPC ............ *C22B 11/06* (2013.01); *B22F 9/082* (2013.01); *B22F 9/24* (2013.01); *C22B 3/22* (2013.01); *C22B 11/04* (2013.01); *B22F 2301/255* (2013.01)

(58) Field of Classification Search
CPC . C22B 11/06; C22B 3/22; C22B 11/04; B22F 9/082; B22F 9/24

USPC ......................................................... 75/365
See application file for complete search history.

(56) References Cited

U.S. PATENT DOCUMENTS

| | | | |
|---|---|---|---|
| 776,131 A | 11/1904 | Gifford et al. | |
| 961,924 A | 6/1910 | Wohlwill | |
| 1,883,234 A * | 10/1932 | Lennox | C22B 1/08 75/657 |
| 2,199,391 A | 5/1940 | Blaut | |

(Continued)

FOREIGN PATENT DOCUMENTS

| | | |
|---|---|---|
| CA | 120941 A | 9/1909 |
| CA | 395394 | 3/1941 |

(Continued)

OTHER PUBLICATIONS

Facebook status update by "Pace Financing and Contractor Services", Jun. 28, 2018, post has since been removed.

(Continued)

*Primary Examiner* — Melissa S Swain

(57) ABSTRACT

A method, and systems in which such method may be practiced, allow for the separation of elemental metals from metal alloy. A metal alloy is atomized to form metal alloy particulates. The metal alloy particulates are exposed to an oxidizing agent, such as chlorine gas in the presence of a salt, such as NaCl, an acid, such as HCl, and water. The resulting solution may be filtered to remove particulates, reduced, filtered, reduced, filtered, and so on. In aspects, the method is used to refine gold alloy by oxidation of elemental sponge gold to gold chloride followed by reduction to pure elemental gold.

6 Claims, 8 Drawing Sheets

(56) References Cited

U.S. PATENT DOCUMENTS

| | | | |
|---|---|---|---|
| 2,829,967 A * | 4/1958 | Schlecht | C22B 11/06 |
| | | | 75/421 |
| 3,024,084 A * | 3/1962 | Fothergill | C01G 55/001 |
| | | | 423/463 |
| 3,986,899 A | 10/1976 | Kole et al. | |
| 4,011,077 A | 3/1977 | Kaufman | |
| 4,041,126 A | 8/1977 | Baltz et al. | |
| 4,094,668 A | 6/1978 | Yannopoulos et al. | |
| 4,124,617 A | 11/1978 | Knifton | |
| 4,131,454 A | 12/1978 | Piret et al. | |
| 4,163,046 A | 7/1979 | Subramanian et al. | |
| 4,172,087 A | 10/1979 | Knifton | |
| 4,192,723 A | 3/1980 | Laude et al. | |
| 4,197,275 A * | 4/1980 | Parker | C01G 5/003 |
| | | | 423/491 |
| 4,231,815 A | 11/1980 | Snyder | |
| 4,260,139 A | 4/1981 | Oliver et al. | |
| 4,290,967 A | 9/1981 | Campbell et al. | |
| 4,319,922 A | 3/1982 | Macdonald | |
| 4,319,923 A | 3/1982 | Falanga et al. | |
| 4,337,091 A | 6/1982 | El-Shazly et al. | |
| 4,353,740 A | 10/1982 | Dunn | |
| 4,374,876 A | 2/1983 | El-Shazly et al. | |
| 4,378,285 A | 3/1983 | Castellanso et al. | |
| 4,389,248 A | 6/1983 | Iio et al. | |
| 4,390,366 A | 6/1983 | Lea et al. | |
| 4,397,686 A | 8/1983 | Winkler et al. | |
| 4,416,692 A | 11/1983 | Burch | |
| 4,419,325 A | 12/1983 | Prasad | |
| 4,427,442 A | 1/1984 | Day | |
| 4,441,993 A | 4/1984 | Howald | |
| 4,451,639 A | 5/1984 | Prasad | |
| 4,462,879 A | 7/1984 | Castellanos et al. | |
| 4,525,254 A | 6/1985 | Feofanov et al. | |
| 4,536,597 A | 8/1985 | Pesa | |
| 4,539,177 A | 9/1985 | Prasad | |
| 4,557,759 A | 12/1985 | McGrew et al. | |
| 4,629,807 A | 12/1986 | Knifton | |
| 4,637,865 A | 1/1987 | Sergent et al. | |
| 4,639,378 A | 1/1987 | Inoue | |
| 4,654,145 A | 3/1987 | Demopoulos et al. | |
| 4,655,895 A | 4/1987 | Feofanov et al. | |
| 4,670,047 A | 6/1987 | Kopatz | |
| 4,670,052 A | 6/1987 | Stanley et al. | |
| 4,711,660 A | 12/1987 | Kemp et al. | |
| 4,719,145 A | 1/1988 | Neely | |
| 4,723,998 A | 2/1988 | O'Neil | |
| 4,731,110 A | 3/1988 | Kopatz et al. | |
| 4,746,379 A | 5/1988 | Rabinkin | |
| 4,770,700 A | 9/1988 | Bertha | |
| 4,822,633 A | 4/1989 | Inoue | |
| 4,836,982 A | 6/1989 | Brupbacher | |
| 4,857,107 A | 8/1989 | Davis | |
| 4,859,293 A | 8/1989 | Hirako et al. | |
| 4,888,209 A | 12/1989 | Neely | |
| 4,895,626 A | 1/1990 | Shor | |
| 4,915,905 A | 4/1990 | Kampe et al. | |
| 4,961,856 A | 10/1990 | Dalton et al. | |
| 4,970,571 A | 11/1990 | Yamakawa et al. | |
| 5,004,500 A | 4/1991 | Dunn et al. | |
| 5,009,755 A | 4/1991 | Shor | |
| 5,015,534 A | 4/1991 | Kampe et al. | |
| 5,045,290 A | 9/1991 | Harris et al. | |
| 5,049,184 A | 9/1991 | Harner et al. | |
| 5,137,700 A | 8/1992 | Sloan | |
| 5,198,154 A | 3/1993 | Yokoyama et al. | |
| 5,198,273 A | 3/1993 | Ando et al. | |
| 5,232,492 A | 8/1993 | Krulik et al. | |
| 5,238,662 A * | 8/1993 | Dubrovsky | C01G 1/06 |
| | | | 75/637 |
| 5,242,511 A | 9/1993 | Yokoyama et al. | |
| 5,252,522 A | 10/1993 | Dorbath et al. | |
| 5,261,945 A | 11/1993 | Awadalla | |
| 5,354,353 A | 10/1994 | Fountain et al. | |
| 5,354,359 A | 10/1994 | Wan et al. | |
| 5,372,794 A | 12/1994 | Lemaire et al. | |
| 5,393,388 A | 2/1995 | Herrmann et al. | |
| 5,405,430 A | 4/1995 | Groves et al. | |
| 5,490,870 A | 2/1996 | Fountain et al. | |
| 5,506,363 A | 4/1996 | Grate et al. | |
| 5,557,014 A | 9/1996 | Grate et al. | |
| 5,603,750 A | 2/1997 | Sierakowski et al. | |
| 5,614,004 A | 3/1997 | Wachi et al. | |
| 5,660,619 A | 8/1997 | Wachi et al. | |
| 5,683,490 A | 11/1997 | Earley et al. | |
| 5,761,779 A | 6/1998 | Maruyama et al. | |
| 5,785,736 A | 7/1998 | Thomas et al. | |
| 5,828,127 A | 10/1998 | Yamagata et al. | |
| 5,882,502 A | 3/1999 | Gomez | |
| 5,908,803 A | 6/1999 | Leconte et al. | |
| 5,961,833 A | 10/1999 | Green et al. | |
| 6,042,894 A | 3/2000 | Goto et al. | |
| 6,045,601 A | 4/2000 | Tan | |
| 6,075,161 A | 6/2000 | Langguth et al. | |
| 6,090,341 A | 7/2000 | Vodrahalli | |
| 6,126,720 A | 10/2000 | Okada et al. | |
| 6,162,278 A | 12/2000 | Hu | |
| 6,191,060 B1 | 2/2001 | Ofori | |
| 6,232,651 B1 | 5/2001 | Lee et al. | |
| 6,287,371 B1 | 9/2001 | Ota et al. | |
| 6,337,056 B1 | 1/2002 | Reverso | |
| 6,355,175 B1 | 3/2002 | Green et al. | |
| 6,383,248 B1 | 5/2002 | Taylor et al. | |
| 6,410,241 B1 | 6/2002 | Sykes et al. | |
| 6,558,448 B2 | 5/2003 | Hu | |
| 6,602,319 B1 | 8/2003 | Murthy et al. | |
| 6,660,059 B2 | 12/2003 | Ji et al. | |
| 6,699,302 B1 | 3/2004 | Jones et al. | |
| 6,736,886 B2 | 5/2004 | Suda et al. | |
| 6,740,287 B2 | 5/2004 | Billiet et al. | |
| 6,759,004 B1 | 7/2004 | Dwivedi | |
| 6,770,765 B2 | 8/2004 | Weisbeck et al. | |
| 6,797,409 B2 | 9/2004 | Ivey | |
| 6,852,425 B2 | 2/2005 | Hu | |
| 6,900,018 B2 | 5/2005 | Sykes et al. | |
| 7,018,833 B2 | 3/2006 | Sykes et al. | |
| 7,049,098 B2 | 5/2006 | Sykes et al. | |
| 7,066,983 B2 | 6/2006 | Ji et al. | |
| 7,166,796 B2 | 1/2007 | Nicoloau | |
| 7,176,036 B2 | 2/2007 | Wang et al. | |
| 7,205,459 B1 | 4/2007 | Larkins et al. | |
| 7,468,340 B2 | 12/2008 | Ohya et al. | |
| 7,473,406 B2 | 1/2009 | Jasra et al. | |
| 7,524,929 B2 | 4/2009 | Carmeli et al. | |
| 7,559,974 B2 | 7/2009 | Ji et al. | |
| 7,655,321 B2 | 2/2010 | Albrecht et al. | |
| 7,682,420 B2 | 3/2010 | Abe et al. | |
| 7,682,704 B2 | 3/2010 | Dwivedi | |
| 7,704,298 B2 | 4/2010 | Ji et al. | |
| 7,740,683 B2 | 6/2010 | Thorsson et al. | |
| 7,758,916 B2 | 7/2010 | Schmid et al. | |
| 7,773,131 B2 | 8/2010 | Kusuda et al. | |
| 7,776,131 B2 | 8/2010 | Shoji et al. | |
| 7,927,744 B2 | 4/2011 | Mizutani et al. | |
| 7,972,412 B2 * | 7/2011 | Bergeron | C22B 11/06 |
| | | | 75/631 |
| 8,016,912 B2 | 9/2011 | Fekete et al. | |
| 8,016,977 B2 | 9/2011 | Rasmussen et al. | |
| 8,017,835 B2 | 9/2011 | Chappell et al. | |
| 8,034,195 B2 | 10/2011 | Schmid et al. | |
| 8,039,806 B2 | 10/2011 | Frank et al. | |
| 8,123,980 B2 | 2/2012 | Kijima et al. | |
| 8,158,281 B2 | 4/2012 | Ishihara et al. | |
| 8,173,025 B2 | 5/2012 | Reidhead et al. | |
| 8,173,026 B2 | 5/2012 | Rasmussen et al. | |
| 8,212,005 B2 | 7/2012 | Carmeli et al. | |
| 8,329,343 B2 | 12/2012 | Yamaguchi et al. | |
| 8,348,621 B2 | 1/2013 | Lafont | |
| 8,450,236 B2 | 4/2013 | Fu et al. | |
| 8,556,237 B2 | 10/2013 | Yamaguchi et al. | |
| 8,597,399 B2 | 12/2013 | Ji et al. | |
| 8,633,270 B2 | 1/2014 | Lochtman et al. | |
| 8,636,920 B2 | 1/2014 | Kijima et al. | |
| 8,697,399 B2 | 4/2014 | Huang et al. | |

(56) References Cited

U.S. PATENT DOCUMENTS

| | | |
|---|---|---|
| 8,741,238 B2 | 6/2014 | Dreisinger |
| 8,779,164 B2 | 7/2014 | Leeuwen et al. |
| 8,821,613 B2 | 9/2014 | Ji et al. |
| 8,912,346 B2 | 12/2014 | Leeuwen et al. |
| 8,932,761 B2 | 1/2015 | Yamaguchi et al. |
| 8,974,572 B2 | 3/2015 | Uehara |
| 8,986,880 B2 | 3/2015 | Odani et al. |
| 8,993,166 B2 | 3/2015 | Mizutani et al. |
| 9,016,912 B1 | 4/2015 | Gustafson |
| 9,017,542 B2 | 4/2015 | Zhou et al. |
| 9,039,724 B2 | 5/2015 | Amplatz et al. |
| 9,039,806 B2 | 5/2015 | Dreisinger et al. |
| 9,115,418 B2 | 8/2015 | Nakamura et al. |
| 9,118,062 B2 | 8/2015 | Yamaguchi et al. |
| 9,127,618 B2 | 9/2015 | Azevedo et al. |
| 9,127,619 B2 | 10/2015 | Lineton et al. |
| 9,166,221 B2 | 10/2015 | Yamaguchi et al. |
| 9,206,492 B2 | 12/2015 | Lalancette et al. |
| 9,209,480 B2 | 12/2015 | Odani et al. |
| 9,219,218 B2 | 12/2015 | Ishigami et al. |
| 9,339,585 B2 | 5/2016 | Yao et al. |
| 9,347,113 B2 * | 5/2016 | Shuck ........................ C22B 3/42 |
| 9,382,776 B2 | 7/2016 | Murphree et al. |
| 9,431,650 B2 | 8/2016 | Yamaguchi et al. |
| 9,499,643 B2 | 11/2016 | Maliverney et al. |
| 9,605,045 B2 | 3/2017 | Daniell |
| 9,657,302 B2 | 5/2017 | Daniell |
| 9,702,028 B2 | 7/2017 | Otsuka et al. |
| 9,732,398 B2 | 8/2017 | Lakshmanan et al. |
| 9,735,017 B2 | 8/2017 | Murakami et al. |
| 9,742,007 B2 | 8/2017 | Hirose et al. |
| 9,742,036 B2 | 8/2017 | Yamaguchi |
| 9,799,457 B2 | 10/2017 | Ramello et al. |
| 9,844,774 B2 | 12/2017 | Schueth et al. |
| 9,881,877 B2 | 1/2018 | Kawabata |
| 9,972,579 B1 * | 5/2018 | Kawabata ................ H01L 25/50 |
| 10,065,276 B2 | 9/2018 | Azevedo et al. |
| 10,099,211 B2 | 10/2018 | Knott et al. |
| 10,136,703 B2 | 11/2018 | Gooch et al. |
| 10,174,401 B2 | 1/2019 | Wyatt et al. |
| 10,205,163 B2 | 2/2019 | Yamaguchi et al. |
| 10,256,194 B2 | 3/2019 | Kawabata |
| 10,269,727 B2 | 4/2019 | Kawabata |
| 10,292,265 B2 | 5/2019 | Kasuga et al. |
| 10,299,376 B2 | 5/2019 | Nakamura et al. |
| 10,403,582 B2 | 9/2019 | Kawabata |
| 10,443,139 B2 | 10/2019 | Mills |
| 10,617,788 B2 | 4/2020 | McCoy |
| 10,622,126 B2 | 4/2020 | Yamamoto |
| 10,665,855 B2 | 5/2020 | Morozumi et al. |
| 10,669,608 B2 | 6/2020 | Lundström et al. |
| 10,796,921 B2 | 10/2020 | Minami et al. |
| 10,836,867 B2 | 11/2020 | Knott |
| 10,888,973 B2 | 1/2021 | Franke et al. |
| 11,072,053 B2 | 7/2021 | Franke et al. |
| 11,072,115 B2 | 7/2021 | Franke et al. |
| 2002/0081739 A1 | 6/2002 | Brill et al. |
| 2002/0150940 A1 | 10/2002 | Sykes et al. |
| 2003/0018991 A1 | 1/2003 | Lazzeri et al. |
| 2003/0083195 A1 | 5/2003 | Nakamaru et al. |
| 2003/0138784 A1 | 7/2003 | Sykes et al. |
| 2004/0133019 A1 | 7/2004 | Dugal et al. |
| 2004/0138480 A1 | 7/2004 | Weisbeck et al. |
| 2004/0197347 A1 | 10/2004 | Sykes et al. |
| 2004/0217061 A1 | 11/2004 | Corzani et al. |
| 2004/0230083 A1 | 11/2004 | Weisbeck et al. |
| 2005/0083785 A1 | 4/2005 | Shiokawa et al. |
| 2005/0176264 A1 | 8/2005 | Lai et al. |
| 2005/0208125 A1 | 9/2005 | Politi et al. |
| 2005/0216959 A1 | 9/2005 | Brill et al. |
| 2005/0250008 A1 | 11/2005 | Mizutani et al. |
| 2006/0095982 A1 | 5/2006 | Daniell |
| 2006/0123515 A1 | 6/2006 | Daniell |
| 2006/0236813 A1 * | 10/2006 | Zhao ........................ B22F 9/24 75/711 |
| 2006/0285989 A1 | 12/2006 | Schade |
| 2007/0067862 A1 | 3/2007 | Daniell |
| 2007/0124830 A1 | 5/2007 | Daniell |
| 2007/0124838 A1 | 5/2007 | Daniell |
| 2008/0081864 A1 | 4/2008 | Takano |
| 2008/0143625 A1 | 6/2008 | Mizushima et al. |
| 2008/0206651 A1 | 8/2008 | Kawase et al. |
| 2008/0220988 A1 | 9/2008 | Zhou |
| 2008/0261114 A1 | 10/2008 | Ishihara |
| 2009/0047170 A1 | 2/2009 | Shoji et al. |
| 2009/0148778 A1 | 6/2009 | Kawase et al. |
| 2009/0226819 A1 | 9/2009 | Ihara et al. |
| 2009/0285976 A1 | 11/2009 | Lochtman et al. |
| 2009/0301891 A1 | 12/2009 | Locktman et al. |
| 2009/0321123 A1 | 12/2009 | Lochtman et al. |
| 2010/0009094 A1 | 1/2010 | Lochtman et al. |
| 2010/0021657 A1 | 1/2010 | Lochtman et al. |
| 2010/0075233 A1 | 3/2010 | Yamaguchi et al. |
| 2010/0170626 A1 | 7/2010 | Lochtman et al. |
| 2010/0176090 A1 | 7/2010 | Lochtman et al. |
| 2010/0178584 A1 | 7/2010 | Hibino et al. |
| 2010/0223944 A1 | 9/2010 | Tsujimoto et al. |
| 2010/0251425 A9 | 9/2010 | Daniell |
| 2010/0296987 A1 | 11/2010 | Hyvarinen et al. |
| 2011/0064937 A1 | 3/2011 | Mukoyama et al. |
| 2011/0083531 A1 | 4/2011 | Soldenhoff |
| 2011/0129607 A1 | 6/2011 | Lee et al. |
| 2012/0014827 A1 | 1/2012 | Schade |
| 2012/0027652 A1 | 2/2012 | Dreisinger |
| 2012/0040872 A1 | 2/2012 | Zhou |
| 2012/0090825 A1 | 4/2012 | Yarin et al. |
| 2012/0118795 A1 | 5/2012 | Ogram |
| 2012/0125670 A1 | 5/2012 | Kato et al. |
| 2012/0231527 A1 | 9/2012 | Dubois-Calero et al. |
| 2013/0042912 A1 | 2/2013 | Kurihara et al. |
| 2014/0047954 A1 | 2/2014 | Ji et al. |
| 2014/0236772 A1 | 8/2014 | McCoy et al. |
| 2014/0238191 A1 | 8/2014 | Otsuka et al. |
| 2015/0320158 A1 | 11/2015 | Duffy |
| 2016/0045841 A1 | 2/2016 | Kaplan et al. |
| 2016/0166757 A1 | 6/2016 | Koyama et al. |
| 2016/0263653 A1 | 9/2016 | Kim et al. |
| 2017/0044644 A1 | 2/2017 | Goldstein et al. |
| 2017/0247805 A1 | 8/2017 | Thus et al. |
| 2018/0318922 A1 | 11/2018 | Valls Anglés |
| 2018/0369970 A1 | 12/2018 | Azevedo et al. |
| 2019/0035744 A1 | 1/2019 | Kawabata |
| 2019/0048449 A1 | 2/2019 | Matsunaga et al. |

FOREIGN PATENT DOCUMENTS

| | | |
|---|---|---|
| CA | 1061573 | 9/1979 |
| CA | 1062476 | 9/1979 |
| CA | 1197986 | 12/1985 |
| CA | 1209523 | 8/1986 |
| CN | 1030944 | 2/1989 |
| CN | 1070229 | 3/1993 |
| CN | 1237644 | 12/1999 |
| CN | 1270235 | 10/2000 |
| CN | 2443971 | 8/2001 |
| CN | 1352310 | 6/2002 |
| CN | 1366093 | 8/2002 |
| CN | 1450182 | 10/2003 |
| CN | 1683573 | 10/2005 |
| CN | 1800422 | 7/2006 |
| CN | 1821060 | 8/2006 |
| CN | 1932052 | 3/2007 |
| CN | 101028612 | 9/2007 |
| CN | 101029357 | 9/2007 |
| CN | 101082084 | 12/2007 |
| CN | 101104587 | 1/2008 |
| CN | 101255502 | 9/2008 |
| CN | 101386930 | 3/2009 |
| CN | 101451190 | 6/2009 |
| CN | 101451198 | 6/2009 |
| CN | 101519731 | 9/2009 |
| CN | 101560608 | 10/2009 |
| CN | 201330288 | 10/2009 |
| CN | 101569889 | 11/2009 |

(56) References Cited

FOREIGN PATENT DOCUMENTS

| | | |
|---|---|---|
| CN | 101570830 | 11/2009 |
| CN | 101660061 | 3/2010 |
| CN | 101775501 | 7/2010 |
| CN | 101787547 | 7/2010 |
| CN | 101793637 | 8/2010 |
| CN | 101818250 | 9/2010 |
| CN | 101831553 | 9/2010 |
| CN | 101850354 | 10/2010 |
| CN | 101928838 | 12/2010 |
| CN | 201686758 | 12/2010 |
| CN | 101942549 | 1/2011 |
| CN | 101949005 | 1/2011 |
| CN | 101956078 | 1/2011 |
| CN | 101974698 | 2/2011 |
| CN | 101985691 | 3/2011 |
| CN | 102031383 | 4/2011 |
| CN | 102031404 | 4/2011 |
| CN | 102041393 | 5/2011 |
| CN | 102086029 | 6/2011 |
| CN | 102114584 | 7/2011 |
| CN | 102134653 | 7/2011 |
| CN | 102134654 | 7/2011 |
| CN | 102162035 | 8/2011 |
| CN | 102218372 | 10/2011 |
| CN | 102230083 | 11/2011 |
| CN | 102274978 | 12/2011 |
| CN | 102277497 | 12/2011 |
| CN | 102392152 | 3/2012 |
| CN | 102491287 | 6/2012 |
| CN | 102560137 | 7/2012 |
| CN | 102560534 | 7/2012 |
| CN | 102676837 | 9/2012 |
| CN | 102690955 | 9/2012 |
| CN | 102703707 | 10/2012 |
| CN | 102719675 | 10/2012 |
| CN | 102776368 | 11/2012 |
| CN | 102923882 | 2/2013 |
| CN | 102925705 | 2/2013 |
| CN | 102936659 | 2/2013 |
| CN | 102978658 | 3/2013 |
| CN | 103014760 | 4/2013 |
| CN | 103131866 | 6/2013 |
| CN | 103194770 | 7/2013 |
| CN | 103290223 | 9/2013 |
| CN | 103320620 | 9/2013 |
| CN | 103342387 | 10/2013 |
| CN | 103498052 | 1/2014 |
| CN | 103526042 | 1/2014 |
| CN | 103649348 | 3/2014 |
| CN | 103821009 | 5/2014 |
| CN | 103882240 | 6/2014 |
| CN | 103882243 | 6/2014 |
| CN | 103931783 | 7/2014 |
| CN | 103937988 | 7/2014 |
| CN | 104004907 | 8/2014 |
| CN | 104018186 | 9/2014 |
| CN | 104047024 | 9/2014 |
| CN | 104109763 | 10/2014 |
| CN | 104308124 | 1/2015 |
| CN | 204162762 | 2/2015 |
| CN | 104593614 | 5/2015 |
| CN | 104605070 | 5/2015 |
| CN | 104643426 | 5/2015 |
| CN | 104692416 | 6/2015 |
| CN | 104789783 | 7/2015 |
| CN | 104911364 | 9/2015 |
| CN | 104975182 | 10/2015 |
| CN | 105112681 | 12/2015 |
| CN | 105132708 | 12/2015 |
| CN | 105256139 | 1/2016 |
| CN | 105621901 | 6/2016 |
| CN | 105671315 | 6/2016 |
| CN | 105886806 | 8/2016 |
| CN | 106119568 | 11/2016 |
| CN | 106148723 | 11/2016 |
| CN | 106222424 | 12/2016 |
| CN | 106222431 | 12/2016 |
| CN | 106244822 | 12/2016 |
| CN | 106256914 | 12/2016 |
| CN | 106298721 | 1/2017 |
| CN | 106367609 | 2/2017 |
| CN | 106591592 | 4/2017 |
| CN | 106676595 | 5/2017 |
| CN | 106702168 | 5/2017 |
| CN | 106868545 | 6/2017 |
| CN | 106884093 | 6/2017 |
| CN | 107217135 | 9/2017 |
| CN | 206521510 | 9/2017 |
| CN | 107266229 | 10/2017 |
| CN | 107326179 | 11/2017 |
| CN | 107460324 | 12/2017 |
| CN | 107586953 | 1/2018 |
| CN | 107805711 | 3/2018 |
| CN | 207518241 | 6/2018 |
| CN | 207685355 | 8/2018 |
| CN | 207845803 | 9/2018 |
| CN | 108624759 | 10/2018 |
| CN | 110863110 | 3/2020 |
| CN | 114317997 A * | 4/2022 |
| DE | 3145006 | 6/1982 |
| DE | 19852077 | 6/2000 |
| DE | 10053450 | 5/2002 |
| DE | 102009021181 | 11/2010 |
| EA | 201700012 | 6/2018 |
| EP | 118633 | 9/1984 |
| EP | 3418403 | 12/2018 |
| GB | 190600146 | 12/1906 |
| GB | 190525122 | 1/1907 |
| GB | 190600149 | 1/1907 |
| GB | 190700530 | 10/1907 |
| GB | 190906276 | 7/1909 |
| GB | 190914660 | 6/1910 |
| GB | 191511818 | 2/1916 |
| GB | 161656 | 4/1921 |
| GB | 263642 | 1/1927 |
| GB | 265036 | 2/1927 |
| GB | 435731 | 9/1935 |
| GB | 483741 | 4/1938 |
| GB | 485089 | 5/1938 |
| GB | 569444 | 5/1945 |
| GB | 578102 | 6/1946 |
| GB | 587584 | 4/1947 |
| GB | 803261 | 10/1958 |
| GB | 910826 | 11/1962 |
| GB | 989233 | 4/1965 |
| GB | 1055622 | 1/1967 |
| GB | 1079013 | 8/1967 |
| GB | 1388794 | 3/1975 |
| GB | 1449215 | 9/1976 |
| GB | 2018828 | 10/1979 |
| IN | 176480 | 6/1996 |
| JP | S6067633 | 4/1985 |
| JP | S60208435 | 10/1985 |
| JP | S6137932 | 2/1986 |
| JP | S62185840 | 8/1987 |
| JP | S6324089 | 2/1988 |
| JP | H06306671 | 11/1994 |
| JP | H10326803 | 12/1998 |
| JP | H11222632 | 8/1999 |
| JP | 2000178669 | 6/2000 |
| JP | 2002030355 | 1/2002 |
| JP | 2002275561 | 9/2002 |
| JP | 2004018933 | 1/2004 |
| JP | 2006057133 | 3/2006 |
| JP | 2007-154250 | 6/2007 |
| JP | 2011058018 | 3/2011 |
| JP | 2015218370 | 12/2015 |
| JP | 2017171997 | 9/2017 |
| JP | 2018150597 | 9/2018 |
| KR | 20000037955 | 7/2000 |
| KR | 20000049783 | 8/2000 |
| KR | 20010054356 | 7/2001 |
| KR | 100742513 | 7/2007 |
| KR | 100784410 | 12/2007 |

(56) References Cited

FOREIGN PATENT DOCUMENTS

| | | |
|---|---|---|
| KR | 20090123136 | 12/2009 |
| KR | 20140087501 | 7/2014 |
| KR | 101630087 | 6/2016 |
| KR | 20180004862 | 1/2018 |
| KR | 101817079 | 2/2018 |
| KR | 101844771 | 4/2018 |
| KR | 101842107 | 5/2018 |
| KR | 20180073492 | 7/2018 |
| PL | 309768 | 2/1997 |
| RO | 121919 | 7/2008 |
| RO | 125168 | 1/2010 |
| RO | 128995 | 11/2013 |
| RS | 20130252 | 2/2015 |
| RU | 2025516 | 12/1994 |
| RU | 94036689 | 4/1997 |
| RU | 2164255 | 3/2001 |
| RU | 2180008 | 2/2002 |
| RU | 2181780 | 4/2002 |
| RU | 2003113496 | 1/2005 |
| RU | 2003130045 | 7/2005 |
| RU | 2291212 | 1/2007 |
| RU | 2006128807 | 2/2008 |
| RU | 2321648 | 4/2008 |
| RU | 2516180 | 5/2014 |
| RU | 2553270 | 6/2015 |
| TW | 200912962 | 3/2009 |
| WO | 8607046 | 12/1986 |
| WO | 2004106560 | 12/2004 |
| WO | WO-2005106051 A1 * | 11/2005 ........... C22B 11/044 |
| WO | WO-2005106052 A1 * | 11/2005 ........... C22B 11/044 |
| WO | WO-2006043158 A1 * | 4/2006 ............... C01F 5/40 |
| WO | WO-2007074360 A2 * | 7/2007 ............... C01F 5/40 |
| WO | 2014105867 | 7/2014 |
| WO | 2014185817 | 11/2014 |
| WO | 2014193929 | 12/2014 |
| WO | 2014205184 | 12/2014 |
| WO | 2015001023 | 1/2015 |
| WO | 2015004018 | 1/2015 |
| WO | 2015031984 | 3/2015 |
| WO | 2015032253 | 3/2015 |
| WO | 2015032282 | 3/2015 |
| WO | 2015032809 | 3/2015 |
| WO | 2015032997 | 3/2015 |
| WO | 2015033850 | 3/2015 |
| WO | 2015034151 | 3/2015 |
| WO | 2015034231 | 3/2015 |
| WO | 2015034260 | 3/2015 |
| WO | 2015034715 | 3/2015 |
| WO | 2015034834 | 3/2015 |
| WO | 2015034852 | 3/2015 |
| WO | 2015034990 | 3/2015 |
| WO | 2015035116 | 3/2015 |
| WO | 2016131445 | 8/2016 |
| ZA | 200205292 | 7/2003 |
| ZM | 4374 | 11/1974 |

OTHER PUBLICATIONS

PCT International Search Search Report and Written Opinion in International Application PCT/US21/46538, dated Nov. 24, 2021, 3 pages.

* cited by examiner

| Test # (602) | Minutes (604) | SO2/CF (606) | Temp Start / End (608) | Polyvinyl Alcohol (610) | 1-Butanol (612) | 2-Methyl/2-Butanol (614) | Isopropyl Alcohol (616) | Pre Precipitation MV (618) | Post Precipitation MV (620) |
|---|---|---|---|---|---|---|---|---|---|
| 1 | 35 | 2.45 CF | 50 F / 75 F | NA | NA | NA | 1 ML | 1121 MV | 649 MV |
| 2 | 35 | 2.45 CF | 55 F / 82 F | NA | NA | NA | 1 ML | 1120 MV | 647 MV |
| 3 | 35 | 2.45 CF | 60 F / 84 F | NA | NA | NA | 1 ML | 1123 MV | 651 MV |
| 4 | 30 | 2.10 CF | 65 F / 91 F | NA | NA | NA | 1 ML | 1126 MV | 654 MV |
| 5 | 30 | 2.10 CF | 70 F / 94 F | NA | NA | NA | 1 ML | 1130 MV | 650 MV |
| 6 | 30 | 2.10 CF | 75 F / 104 F | NA | NA | NA | 1 ML | 1121 MV | 649 MV |
| 7 | 28 | 1.95 CF | 80 F / 106 F | NA | NA | NA | 1 ML | 1126 MV | 651 MV |
| 8 | 28 | 1.96 CF | 85 F / 112 F | NA | NA | NA | 1 ML | 1128 MV | 655 MV |
| 9 | 35 | 15 FM / 1.75 CF | 90 F / 114 F | 1 ML | 1 ML | NA | 1 ML | 1121 MV | 651 MV |
| 10 | 22 | 1.54 CF | 95 F / 122 F | 1 ML | 1 ML | NA | 1 ML | 1125 MV | 649 MV |
| 11 | 25 | 1.75 CF | 100 F / 126 F | 1 ML | 1 ML | NA | NA | 1122 MV | 650 MV |
| 12 | 30 | 2.10 CF | 105 F / 129 F | 1 ML | 1 ML | NA | NA | 1120 MV | 649 MV |
| 13 | 35 | 2.45 CF | 110 F / 140 F | 1 ML | 1 ML | 1 ML | NA | 1121 MV | 652 MV |

Fig. 6

| Test #: | Minutes | CF of Cl2 | Temp Start / End | PLATINUM CHLORIDE RECOVERED GRAMS / % | PALLADIUM CHLORIDE RECOVERED GRAMS / % |
|---|---|---|---|---|---|
| 1 | 45 | 3.15 CF | 130 / 130 | 17.67 GRAMS / .99.26 % | 21.54 GRAMS / 98.58 % |
| 2 | 40 | 2.80 CF | 120 / 120 | 17.69 GRAMS / 99.38 % | 21.56 GRAMS / 98.67 % |
| 3 | 40 | 2.80 CF | 110 / 110 | 17.74 GRAMS / 99.66 % | 21.77 GRAMS / 99.63 |
| 4 | 35 | 2.45 CF | 100 / 100 | 17.72 GRAMS / 99.55 % | 21.86 GRAMS / 100 % |
| 5 | 30 | 2.10 CF | 90 / 90 | 17.76 GRAMS / 99.77 % | 21.83 GRAMS / 99.90 % |
| 6 | 25 | 1.75 CF | 80 / 80 | 17.80 GRAMS / 100 % | 21.850 GRAMS / 100 % |

Fig. 7

| Test #: | Minutes | liters Solution | Temp Start / End | SODIUM HYDROXIDE 50 % | Copper Oxychloride recovered gr / % |
|---|---|---|---|---|---|
| 6 | 35 | 4 liters | 130 / 130 | 40 g | 159.00 g / 90.03 % |
| 5 | 30 | 4 liters | 120 /120 | 40 g | 163.50 g / 92.98 % |
| 4 | 27 | 4 liters | 110 /110 | 40 g | 165.40 g / 93.97 % |
| 3 | 25 | 4 liters | 100/100 | 40 g | 169 g / 96.02 % |
| 2 | 22 | 4 liters | 90 /90 | 40 g | 171 g / 97.15 % |
| 1 | 20 | 4 liters | 80/80 | 40 g | 176 g / 100 % |

Fig. 8

METAL REFINEMENT

CLAIM OF PRIORITY

This application is a continuation of U.S. Non-Provisional application Ser. No. 17/405,837, filed Aug. 18, 2021, which claims priority to and the benefit of U.S. Provisional Application No. 63/067,275, filed August 2020, and is titled Metal Refinement. These disclosures are hereby incorporated by reference herein in their entirety.

INTRODUCTION

Precious metals and other compounds are often mixed or melted together to form alloys. For some applications, it is useful to separate the precious metals from the alloy in a refinement process. This precious metal refinement may be used to separate precious metals, such as gold, silver, platinum, palladium, copper, and zinc, from composite alloys.

Current techniques for refining precious metals, however, leave much to be desired. For example, the current gold refinement techniques, such as the Aqua Regia process, the Miller process, and the Wohlwill process use harsh, environmentally damaging chemicals to refine gold, have long batch processing time, and/or are labor-intensive.

The current use of excess chemicals leads to hazardous working conditions and/or negatively impacts the environment. The Aqua Regia process uses a combination of nitric acid and hydrochloric acid to dissolve or separate the metal alloy into its components; the Wholwill process uses a caustic aqueous chloride solution; the Miller process is a pyro-metallurgical process that uses chlorine gas pumped into the molten gold alloy. These chemicals are highly toxic and often result in the production of toxic fumes.

Additionally, current precious metal refinement techniques require long processing times, during which workers may be exposed to these toxic fumes and harsh working conditions. For example, the Aqua Regia process takes eight (8) hours at temperatures around 149° C. A typical Miller processing time is three (3) hours and produces 95% gold. The metal from the Miller process is then put into a Wohlwill cell which is a very slow electrolytic process and requires a tremendous amount of inventory to be tied up in the electrolyte solution.

The use of excess chemicals in these processes erodes machinery and generally prevents such processes from being automated. Thus, it remains desirable to develop systems and methods of precious metal refinement that reduce the use of harsh chemicals and/or automate the tasks.

It is with respect to these and other considerations that the technology provided herein is disclosed. Also, although relatively specific problems have been discussed, it should be understood that the examples and technologies presented herein should not be limited to solving the specific problems identified in the introduction.

SUMMARY

This Summary is provided to introduce a selection of concepts in a simplified form, which concepts are further described below in the Detailed Description. This Summary is not intended to identify key factors or essential features of the claimed subject matter, nor is it intended to be used to limit the scope of the claimed subject matter.

Aspects of the present technology relate to a hydrometallurgical process and apparatuses that use relatively environmentally friendly (e.g., "green chemistry") reactor technology to refine precious metals and base metals. For example, the technology described herein may be used to refine gold, silver, platinum, palladium, copper, zinc, non-ferrous metals, rare earth metals and other metals from constituent bulk metal alloys. Indeed, the technology described herein may be used to refine gold and other precious metals from scrap jewelry, jewelry sweeps, dory bars, gold ores, and electronic scraps such as phones or computers, to name a few sources. In examples, the technology may be used to dissolve noble metals as well as non-ferrous metals that may exist as a metal chloride. Additionally, as further described herein, aspects of the present technology allow for the recovery of one or more metals aside from the primary metal. For example, platinum recovery, copper as copper oxychloride recovery, or other compounds may be recovered from discharge (e.g., waste) streams of processes used to recover gold from gold alloys.

As further described herein, aspects of the technology exhibit numerous advantages when compared to other precious metal refining methods. For example, under certain conditions, the processing time is reduced by five to ten times than that of other known techniques, chemical usage is reduced by 90% than that of other known techniques, labor is reduced by at least 50% than that of other known techniques, energy needs is decreased 50% than that of other known techniques, and processing space may be reduced to 50% compared to other technologies currently used. Additionally, ambient temperatures of the working environment may be kept at or below 23° C., which may aid in the comfort and safety of precious metal refinement workers. Additionally, for some applications, the present technology may allow for increased purity of the refined metals versus current technology. Additionally, aspects of the technology may use chemicals and techniques that reduce the environmental (e.g., "green chemistry") impact vis-à-vis other technologies.

One benefit of the technology, for some applications, is that the technology allows for metal tanks, valves, piping, pumps, heat exchangers, sensors, that all may be computerized because of the environment (e.g., temperature, pressure, and chemistries) allows for the use of these metal tanks, valves, piping, pumps, heat exchangers, sensors in electronic communication. The other gold recycling process such as Aqua Regia will oxidize these components relatively quickly. The technology also uses less chemicals, shorter process time and decreased labor intensity along an increased total metal accountability per batch compared to other technologies. The recovery yield may be as much as 99.99% of gold ("Au"), silver ("Ag", palladium ("Pd"), platinum ("Pt") and zinc ("Zn").

In aspects of the technology, a multistage process to refine gold is provided.

Aspects of the technology include a method for refining metal. The method includes providing bulk metal. The bulk metal may comprise one or more elemental metals. The method includes atomizing the bulk metal to form atomized particulate metal alloy, wherein each particulate has a size. The method includes mixing the atomized particulate with a brine solution to form a brine solution suspended with atomized metallic particles. The method also includes mixing the brine solution with an acid to form an acidic brine solution suspended with atomized metallic particles. The method also includes chlorinating the acidic solution suspended with atomized metallic particles to form a chlorinated brine solution with metal-chloride precipitate. The method further includes filtering out the metal-chloride precipitate to form a filtered-chlorinated brine solution. The method also includes reducing the filtered-chlorinated brine solution to form an elemental metal precipitate in a solution. The method also includes filtering out the elemental metal precipitate to form an eluent filtrate. The method also includes reducing the eluent filtrate to form a platinum-group precipitate and solution. The method also includes filtering out the platinum-group precipitate to form a base metal solution. The method also includes reducing the base metal solution to form a base metal precipitate and a water-chloride solution. The method also includes filtering out the base metal precipitate to form a water chloride solution.

In aspects of the technology, the metal chloride precipitate is silver chloride and/or the elemental metal precipitate is gold. The brine solution may comprise 95% water and 5% sodium chloride by weight. The platinum-group precipitate may be ammonium chloroplatinate. The base metal precipitate may be copper oxychloride. The temperature of each of the brine solution chlorinated brine solution, the solution suspended with atomized metallic particles, the chlorinated brine solution with metal-chloride precipitate, the metal-filtrate solution, the filtered-chlorinated brine solution, the eluent filtrate, the platinum-group precipitate and solution, the remaining base metal solution, and the water-chloride solution may be kept below 50° C. The acidic brine solution may comprise 3.5% hydrochloric acid, 4.7% sodium chloride, and 91.8% water by weight.

Aspects of the technology include a method of isolating gold from a gold alloy. The method may comprise: providing a gold alloy comprising gold, silver, platinum, and copper; atomizing the gold alloy to form atomized gold alloy particles; suspending the atomized gold alloy particles in a brine solution, the brine solution comprising sodium chloride and water; precipitating a silver chloride by performing a first stage operation, the first stage operation. The first stage operation may comprise: adding hydrochloric acid to the brine solution to form an acidic brine solution; adding a first surface tension reducer to the acidic brine solution; and bubbling chlorine gas through the acidic brine solution to form a chlorinated brine solution with silver-chloride precipitate. The method may also comprise filtering the silver chloride precipitate in a second stage to form a remaining filtered-chlorinated brine solution; reducing the filtered-chlorinated brine solution in a third stage operation. The third stage operation may comprise: adding a second surface tension reducer to the filtered-chlorinated brine solution: bubbling sulfur dioxide into the filtered-chlorinated brine solution for a period of time to form a metal-filtrate solution, wherein the metal-filtrate comprises elemental gold precipitate; filtering out the elemental gold in a fourth stage operation to form a first filtrate. The method may further comprise treating the first filtrate in a fifth-stage operation. The fifth stage operation may comprise adding ammonium chloride to the first filtrate, adding isopropyl alcohol to the first filtrate, bubbling chlorine through the first filtrate to form a platinum-precipitate solution, wherein the platinum-precipitate solution comprises ammonium chloroplatinate precipitate. The method may further comprise filtering the ammonium chloroplatinate precipitate in a sixth-stage operation to form a base metal solution. The method may further comprise treating a base metal solution in a seventh-stage operation. The seventh-stage operation may comprise adding a base to lower the pH of the base metal solution and cause a base metal compound to precipitate; raising the pH to form a water-chloride solution, wherein the water-chloride solution comprises the base metal precipitate. The method may further comprise filtering the water-chloride solution to collect the base metal precipitate in an eighth-stage operation.

In aspects of the technology, the brine solution comprises 5% NaCl in water. The atomized metallic particles may have an average size of 42 microns. Hydrochloric acid ("HCl") may be added such that the resulting acidic brine solution comprises 10% HCl. The third stage operation may result in at least 99.9% of the gold precipitating out of solution. The period of time may be less than 35 minutes. The first surface tension reliever is isopropyl alcohol. The temperature third-stage operation remains below 52° C.

BRIEF DESCRIPTION OF THE DRAWINGS

FIG. 6 illustrates a table of example test data for gold precipitation.
FIG. 7 illustrates a table of example test data for platinum group precipitation.
FIG. 8 illustrates a table of example test data for precipitating copper oxychloride.

DETAILED DESCRIPTION

The terminology used in the disclosure herein is for the purpose of describing particular embodiments only and is not intended to be limiting of the disclosure. As used in the description of the embodiments of the disclosure and the appended claims, the singular forms "a," "an," and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, amount, dose, time, temperature, and the like, is meant to encompass variations of 20%, 10%, 5%, 1%, 0.5%, or even 0.1% of the specified amount. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this disclosure belongs.

Aspects of the technology relate to a system to separate relatively pure metal from metal alloys. For example, gold, copper, platinum, palladium, zinc, silver, and other metals may be separated from gold alloys using the system and methods described herein. Additionally, rare earth metals and other non-ferrous metals may be separated from alloys using the systems and methods described herein. For some applications, metals that form chlorides are selected for separation using the techniques described herein.

Figure 1:
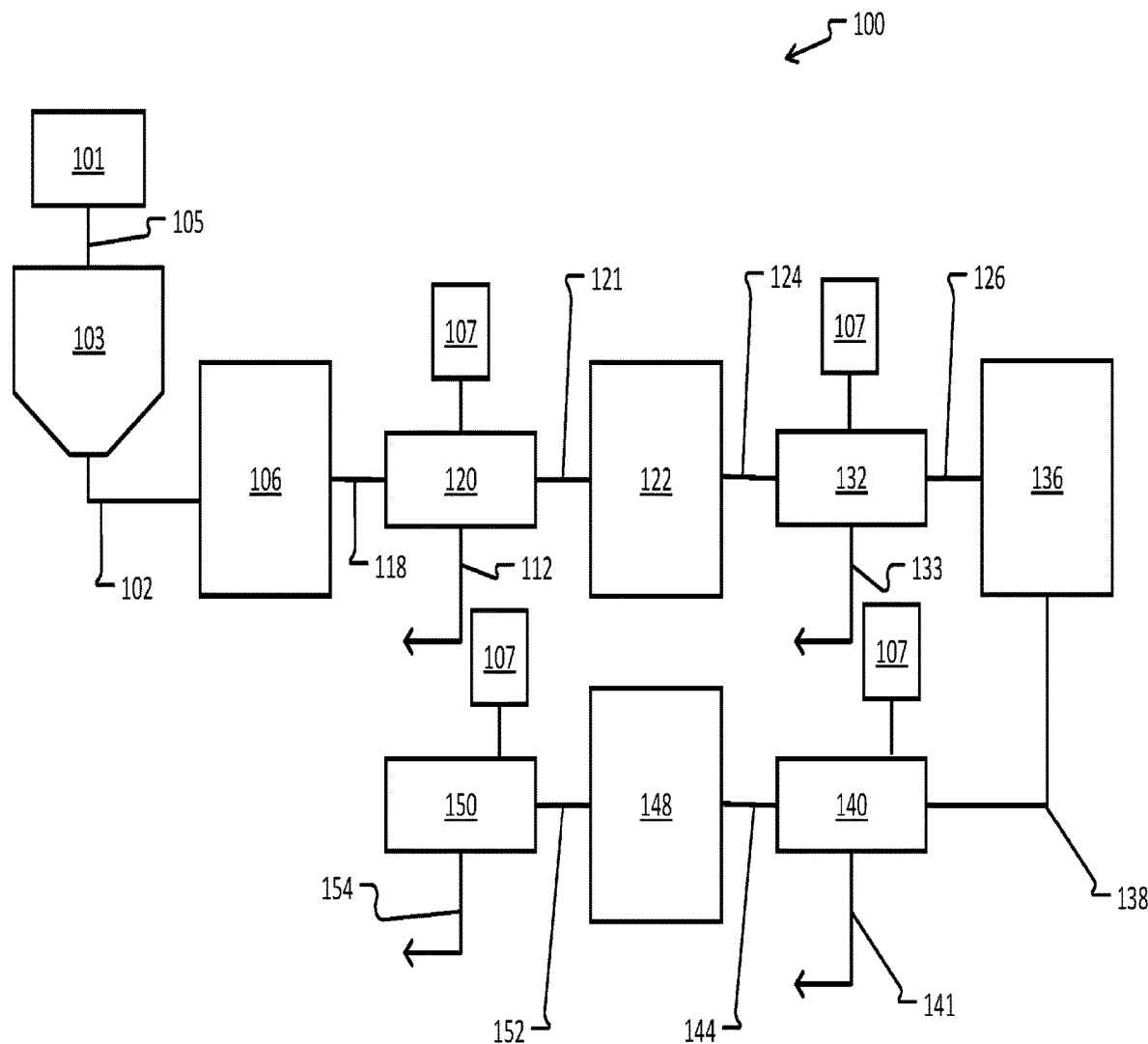
FIG. 1 illustrates an example system for refining metal.

FIG. 1 illustrates an example system 100 for refining metal. As illustrated, FIG. 1 includes a furnace 101. Furnace 101 may heat an alloy up to a sufficient temperature for melting the alloy. Example alloys include bulk metallic material such as scrap jewelry, jewelry sweeps, dory bars, gold ores, and metal portions of electronic scraps. Where the alloy includes gold, the temperature of the metal alloy may be raised to above 1093° C. In other embodiments, higher temperatures may be obtained where the alloy includes platinum or other metals. Heating of the metal alloy may occur using a variety of known techniques and furnaces, or techniques and furnaces later developed appropriate for heating metal alloys.

A furnace conduit 105 directs flow of molten metal alloy from the furnace 101 to atomization chamber 103. The atomization chamber 103 atomizes the molten metal from the furnace 101. Atomization may occur through a variety of means, such as high-pressure water atomization described below. Examples of high-pressure water atomization are provided with further details herein. In aspects of the technology, the atomization chamber produces a mixture of atomized metallic material in a 5% sodium chloride ("NaCl")/95% water ("$H_2O$") solution by weight. In examples, the atomized metallic material has a diameter of about 44 microns ("μm"), about 48 μm, about 52 μm, about 56 μm, about 60 μm, about 64 μm, about 68 μm, about 72 μm, and/or about 75 μm. In some examples, the atomized metallic material is passed through a mesh filter of about 200 mesh, about 230 mesh, about 270 mesh, about 300 mesh, and/or about 325 mesh before proceeding to a metal oxidation reactor system 106. For example, a NaCl/$H_2O$ solution may have atomized metallic material suspended in solution, and the solution may first pass through the mesh filter prior to proceeding to the metal oxidation reactor system 106.

FIG. 1 includes a reactor inlet conduit 102. Reactor inlet conduit 102 serves to direct atomized metallic material, suspended in a salt-water solution in examples, produced in the atomization chamber to the metal oxidation reactor system 106. In additional/alternative aspects of the technology, atomized gold metal alloy is derived from other sources, such as gold metal alloy recyclers, and that atomized gold metal alloy is added to metal oxidation reactor system 106 with salt-water solution, in examples. It will be appreciated that the metal oxidation reactor system 106 may be similar to or the same as the reactor system described with reference to FIG. 4. In an example, metal oxidation reactor system 106 receives the atomized metallic material suspended in the water NaCl solution (also referred to herein as a brine solution). In examples, the concentration of salt is about 3%, about 4%, about 5%, about 6%, and about 7% by weight. In examples, metal oxidation reactor system 106 includes one or more vessels in which oxidization of the atomized metallic material may occur.

In examples, the metal oxidation reactor system 106 may include various means (such as inlets to one or more vessels/reactors) to adjust the brine solution. For example, more water or NaCl may be added to reach a targeted salt concentration. Additionally, other reagents may be added. In a particular example, and acid, such as hydrochloric acid is added to form an acidic brine solution. For example, a solution may comprise about 91.8% water, about 4.7% salt, and about 3.5% HCl by weight. Hydrochloric acid may be added using 33% aqueous hydrochloric acid. In other examples the HCl may be about 1.5%, 2.5%, 4.5%, or 5.5% and the NaCl may be about 3%, 6%, 8%, or 10% by weight. Additionally, the atomized metallic material may be agitated during processing by the metal oxidation reactor system 106 using a variety of means, such as a mechanical agitator or mechanical circulation. In examples, an oxidizing reagent is introduced to the oxidation reactor system 106. For example, chlorine gas may be diffused within the water/salt solution using a variety of means, including a Venturi system or bubble diffuser, thus facilitating reaction with the suspended atomized metallic particles disposed within such brine solution. In some applications, this chemical reaction generates HCl that increases the concentration of HCl as the reaction continues. Additionally, other agents, such as quenching agents, surface tension relievers, surfactants, water, and other reagents, may also be introduced in the metal oxidation reactor system 106. Further details regarding one example of a suitable reactor system are provided with reference to FIG. 4.

The metal oxidation reactor system 106 may be used in a batch process. For example, acidic brine solution may be exposed to the oxidizing agent for a predetermined period of time based on the size, mass, and/or composition of the atomized metallic particles in the acidic brine solution. This may allow for the atomized metallic material to oxidize fully or almost fully. The size of the atomized metallic particle may be selected based to reduce processing time. For example, a smaller size such as 40-45 microns may be selected using a mesh screen. The resulting solution, referred to herein in some places as an oxidized brine solution, will include various reduced metal compounds (e.g., chlorinated metals). For some starting materials, the oxidization of the atomized metallic material will form a precipitate metal, such as silver chloride, which may be filtered out of the oxidized brine solution using one or more filters, such as first filter 120.

As illustrated, first filter conduit 118 directs the flow of the oxidized brine solution to a first filter 120. In aspects of the technology, the first filter 120 is sized and shaped to remove one or more precipitate chlorinated metals, such as silver chloride, from the oxidized brine solution. In examples, the first filter is a centrifugal filter or other mechanical filter capable of removing silver chloride precipitate or other precipitate from the oxidized brine solution received from first filter conduit 118.

Silver chloride or other filtrate/sediment may be directed out of the filter using a discharge conduit 112. In aspects of the technology, the filtrations system comprises a centrifugal filtration system and/or cartridge type systems. The remaining filtrate solution may be directed to precipitation reactor system 122 via precipitation reactor conduit 121.

In examples, precipitation reactor system 122 serves as a vessel in which reduction of a chlorinated or oxidized metal may occur. For example, precipitation reactor system 122 may adjust the salt or water in the remaining filtrate by adding more water or NaCl (or other salt) to the filtrate solution to form a filtrate brine solution. Further, the filtrate brine solution may be agitated during processing by the precipitation reactor system 122 using a variety of means, such as a mechanical agitator or pump circulation. In examples, a reducing reagent is introduced to the oxidation reactor system 122. For example, sulfur dioxide gas may be exposed to the filtrate solution using a Venturi system. Additionally, other agents, such as quenching agents, surfactants, surface tension relievers, water, and other reagents may also be introduced in the precipitation reactor 122. Further details regarding one example of a suitable reactor system are provided with reference to FIG. 4. Precipitation of a noble metal, such as gold, may take place as the noble metal is reduced to form an elemental metal precipitate. The resulting precipitate solution may then be transferred to a second filter 132 through a second filter conduit 124.

Elemental metal, such as gold, may be separated from the precipitate solution in a second filter 132. In aspects of the technology, the second filter 132 comprises a centrifugal filtration system and/or cartridge-type systems.

Elemental gold or other precipitate/sediment may be directed out of the second filter 132 using a second discharge conduit 133. The remaining second filtrate solution is directed to secondary precipitation reactor system 136 via secondary precipitation reactor conduit 126 as illustrated.

In examples, secondary precipitation reactor system 136 serves as a vessel in which further reduction of a chlorinated or oxidized metal may occur. For example, secondary precipitation reactor system 136 may adjust the second filtrate solution by adding more water or NaCl (or other salt) to the second filtrate solution. Further, the second filtrate solution may be agitated during processing by the secondary precipitation reactor system 136 using a variety of means, such as a mechanical agitator or pump circulation. In examples, a reagent is introduced to the secondary precipitation reactor system 136. For example, ammonium chloride and/or chlorine gas may be exposed to the second filtrate solution in the secondary precipitation reactor system through a Venturi or other means. Additionally, other agents, such as quenching agents, surface tension relievers, surfactants, water, and other reagents, may also be introduced in the secondary precipitation reactor 136. Further details regarding one example of a suitable reactor system are provided with reference to FIG. 4. Precipitation of other metals or metal composites, such as platinum and palladium, rhodium and ruthenium chloride, may result. The resulting second precipitate solution may then be transferred to a third filter 140 through a third filter conduit 138.

As illustrated, third filter conduit 138 directs the flow of the second precipitate solution to a third filter 140. In aspects of the technology, the third filter 140 is sized and shaped to remove one or more precipitate chlorinated metals, such as ammonium chloroplatinate, from the second precipitate solution. In examples, the third filter 140 is a centrifugal filter or other mechanical filter capable of removing ammonium chloroplatinate precipitate or other precipitate from the second precipitate solution received from third filter conduit 138. Ammonium chloroplatinate or other precipitate/sediment may be directed out of the third filter 140 using a third discharge conduit 141. The remaining liquid forms a third filtrate solution, which may flow to base metal precipitation reactor system 148 via base metal reactor conduit 144.

In examples, base metal precipitation reactor system 148 serves as a vessel in which further reduction of a chlorinated or oxidized metal may occur. For example, base metals such as copper oxychloride, may be precipitated out in base metal precipitator system 148. Further, adjustment of the third filtrate solution may occur by adding more water or NaCl (or other salt) to the third filtrate solution. Additionally, the third filtrate solution may be agitated during processing in the base metal reactor system 148 using a variety of means, such as a mechanical agitator or recirculating pump system. In examples, reducing agents are introduced to the base metal reactor system 148. For example, sodium hydroxide may be added through a Venturi or other means. Additionally, other agents, such as quenching agents, surfactants, surface tension relievers, water, and other reagents such as hydrochloric acid may also be introduced in the base precipitation system 148. Further details regarding one example of a suitable reactor systems are provided with reference to FIG. 4. Precipitation of a base metal, such as copper oxychloride, may result. The resulting forth precipitate solution may then be transferred to a fourth filter 150 through a third filter conduit 152.

As illustrated, fourth filter conduit 152 directs the flow of the fourth precipitate solution to a fourth filter 150. In aspects of the technology, the fourth filter 150 is sized and shaped to remove one or more precipitate chlorinated metals, such as copper oxychloride, zinc chloride, etc., from the second precipitate solution. In examples, the fourth filter 150 is a centrifugal filter or other mechanical filter capable of removing copper oxychloride precipitate or other precipitate from the fourth precipitate solution received. Copper oxychloride or other precipitate/sediment may be directed out of the fourth filter 150 using a fourth discharge conduit 154.

Various scrubbing systems may be in fluidic communication with scrubbing system 107. As illustrated, scrubbing systems 107 are in fluidic communication with first filter 120, second filter 132, third filter 140, and fourth filter 150. The scrubbing systems may scrub the waste gas coming off the systems during a filtering operation, such as the filtering operations described herein. The scrubbing systems 107 may use $Cl_2$ or $SO_2$ gas scrubbers along with ruptured disk valves, pressure relief valves, gas detectors, small fume hoods and emergency alarms or other devices now known or later developed. The scrubber vacuum lines may be connected to all the tanks as well as a fresh air supply. In examples, gases are kept at or near atmospheric pressure for safety reasons. In a particular example, all the gases drawn to the Venturi system (as described further with reference to FIG. 4) are under vacuum. Other safety means may be employed, such as a computerized monitoring system.

It will be appreciated that the conduits 102, 118, 121, 124, 126, 138, 144, and 152 may be any conduit suitable for the transfer of liquid solution containing sediment. For example, pipes, sluices, and channels may be employed.

Figure 2:
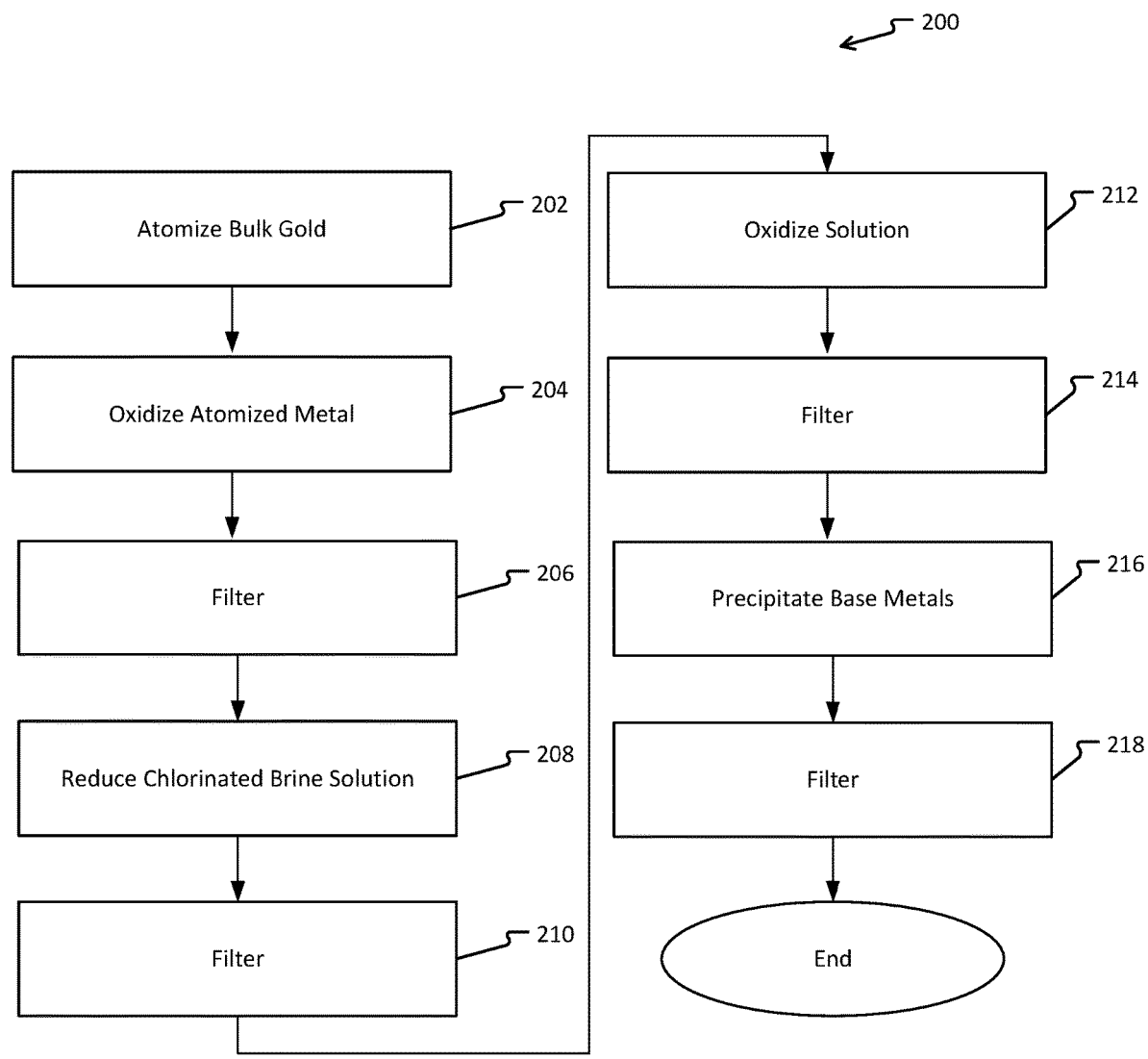
FIG. 2 illustrates a method for refining metal.

FIG. 2 is an example method 200 to refine metal. FIG. 2 begins with atomize operation 202, in which a starting bulk metal, such as gold alloy is atomized. In aspects of the technology, the bulk metal may comprise one or more of scrap jewelry, jewelry sweeps, dory bars, gold ores, and electronic scraps. Bulk metal may be atomized using high-pressure water atomization, such as the water pressure atomization described with reference to FIG. 1. Operation 202 results in atomized metallic particles suspended in a solution. In aspects, the solution is a brine solution having about 5% NaCl/95% water solution by weight. In an example, the atomized metallic particles have a size between about 44 μm to 75 μm. In another example, metallic particles are filtered out using a mesh to select for a particular size, such as no greater than 44 μm.

Method 200 then proceeds to oxidization operation 204. At oxidation operation 204, the solution suspended with atomized metallic particles may be pumped into a vessel, such as the oxidation reactor. The oxidation reactor may be part of a metal oxidation reactor system described with references to FIG. 1. The brine solution may be acidified by adding an acid, such as hydrochloric acid to the system to form an acidic brine solution. In an example, an acidic brine solution comprises about 3.5 HCl/4.7% NaCl in water by weight. During operation 204, the solution may be kept between about 5.5° C. and 30° C.

In an example, chlorine gas is used to at least partially oxidize the atomized metallic particles suspended in the acidic brine solution. For example, the micro-bubble mechanism or venturi system may bubble in chlorine gas to the acidic brine solution. As a non-limiting example, an amount of chlorine gas may be bubbled into the acidic brine solution. The amount of chlorine gas may be 75% of the mass of the atomized metal suspended in the acidic brine solution. This forms a chlorinated brine solution.

In aspects of the technology, the micro-bubbled chlorine gas oxidizes the atomized metal. For example, where the atomized metallic particles include a gold alloy comprising gold, palladium, platinum, copper, silver, and zinc, the use of chlorine gas may result in the formation of gold chloride ($AuCl_3$), palladium chloride ($PdCl_2$), platinum chloride ($PtCl_2$), copper chloride ($CuCl_2$ or $CuCl$) zinc chloride ($ZnCl_2$) and silver chloride ($AgCl$) as provided by reaction 1 below:

FIG. 1. Chlorine Oxidation Reaction

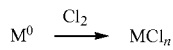

where M is a metal, $Cl_2$ is chlorine gas, and $MCl_n$ represents a metal chloride. Each of the gold chloride, palladium chloride, copper chloride, zinc chloride and platinum chloride may dissolve in solution. Some or all of the silver chloride may not dissolve, and instead form a precipitate. In aspects of the technology, the ratio of water, HCl, NaCl, and atomized metal is controlled to promote the precipitation of silver chloride from solution.

In aspects, the temperature of the chlorinated brine solution is maintained at about 29° C., about 31° C., about 33° C., about 35° C., about 37° C., about 39° C., about 42° C., about 44° C., about 45° C., about 47° C., about 49° C., and about 51° C. during operation 204. In some aspects of the technology, temperature ranging from 5.5-31° C. In aspects of the technology, a surface tension reliever, such as isopropanol, may be added. This may promote the chlorine gas staying in solution, which results in a shorter reaction time for some applications. Operation 204 produces a chlorinated brine solution with metal-chloride precipitate.

Method 200 then proceeds to filter metal-chloride precipitate operation 206. In operation 206, the chlorinated brine solution with metal-chloride precipitate produced in operation 204 is directed towards a filtration system, such as the first filter described with reference to FIG. 1. Metal chloride, such as silver chloride, may be filtered using mechanical means. For example, silver chloride may be filtrated through a centrifugal filter, then a final cartridge (0.5-micron filter), and a rinse water cycle. After filtration, the filtrate containing the gold and other precious metals is transferred to another processing tank for further processing. The silver chloride may be collected for further processing. In aspects of the technology, substantially all the metal precipitate is removed from the chlorinated brine solution. After substantially all the metal precipitate is removed, the remaining filtered-chlorinated brine solution is passed to operation 208.

In operation 208, the remaining filtered-chlorinated brine solution is reduced. In operation 208, one or more of the metal chlorides is reduced using a reducing agent to form an elemental metal precipitate. In aspects of the technology, a precipitation reactor system such as the precipitation reactor system described with reference to FIG. 1 is used. For example, gold chloride may be reduced using sulfur dioxide to produce elemental gold using a precipitation reactor system. A surface tension reducer, such as isopropyl alcohol, may added. In some aspects of the technology, a microbubble diffuser or Venturi system may be used to diffuse sulfur dioxide gas into the filtered-chlorinated brine solution to reduce gold chloride to form sponge gold. During operation 208, the solution may be kept between about 37° C. and 50° C. In some aspects of the technology, the temperature may be kept below 60° C. This results in elemental metal, such as gold, precipitating out of the filtered-chlorinated brine solution to form a metal-filtrate solution. In embodiments where the filtered-chlorinated brine solution includes $AuCl_3$, the following reaction occurs when treated with sulfur dioxide under appropriate conditions:

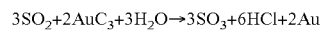

Operation 200 then proceeds to filter elemental metal operation 210. In aspects of the technology, and elemental metal, such as gold from a gold-filtrate solution, is filtered. Filtering may occur using a filter similar to or the same as the second filter described with reference to FIG. 1. The elemental metal may be gathered by filtration and washed (rinse). During operation 208, the elemental metal may be washed. For example, a wash may comprise hydrochloric acid, followed by water, then followed by ammonium hydroxide rinse, then deionized water rinse may be added. The eluent filtrate, the first filtrate containing the other precious metals may then be treated in other operations, such as 212.

Method 200 then proceeds to treat eluate filtrate operation 212. Treating eluate filtrate solution may occur using the same or similar systems described above with reference to the secondary precipitation reactor system. In aspects of the technology, the eluent filtrate (or first filtrate) may contain platinum and palladium in solution, which then may be treated to precipitate out the platinum and palladium group metals separately. For example, the eluent filtrate may be saturated with ammonium chloride. Next, chlorine gas may be bubbled into the solution using a microbubble device or Venturi systems. In an example, a surface tension reliever, such as isopropyl alcohol, is added to facilitate the absorption of the chlorine gas into the solution. In examples, during operation 212, the solution may be kept between about 27° C. to 30° C. In some aspects of the technology, the temperature may be kept below 100° C. In aspects of the technology, operation 212 results ammonium chloroplatinate and palladium-compound precipitate to precipitate, and the resulting solution may be further filtered at operation 214.

Method 200 then proceeds to operation 214, where the resulting ammonium chloroplatinate and palladium-compound precipitate and solution are filtered. Filtration may occur using the same or similar systems as those described with reference to the third filter above. For example, cartridge filters may be used. Where cartridge filters are used, the cartridge filters may be washed with saturated solution of ammonium chloride. Operation 216 separates at least a portion of the ammonium chloroplatinate and palladium-compound precipitate from the remaining base metal solution. The ammonium chloroplatinate and palladium-compound precipitate may be gathered and further processed. The base metal solution then proceeds to operation 216.

Method 200 then proceeds to precipitate base metal operation 216. Base metal operation 218 may be performed using the base metal precipitator systems described above. In operation 218, the base metals compounds, such as copper oxychloride and zinc chloride, are precipitated. In examples, base metal operation comprises two parts. A base such as sodium hydroxide is added to raise the pH of the base metal solution. In aspects of the technology, the pH is raised from about 1 to about 13. In aspects, this causes the base metal compound, such as copper oxychloride or Zinc Chloride, to precipitate. In a second stage, an acid such as hydrochloric acid is added to lower the pH to about 7. During operation 216, the solution may be kept between about 27° C. and 49° C. This forms a water-chloride solution. The water-chloride solution may be further processed in operation 218.

Method 200 then proceeds to filter water-chloride solution in operation 218. In aspects of the technology, the water-chloride solution is filtered using a mechanical separator, such as a centrifuge. Indeed, method 200 may be performed using the same or similar filters as those described with reference to the fourth filter above. For example, a copper oxychloride may be filtered out using a computer-controlled centrifugal filter. The resulting filtrate comprises mainly water, in examples. In aspects of the technology, this wastewater may be recycled for use in one or more stages discussed herein or repurposed for other suitable uses.

Method 200 may be described as a batch process. It will be appreciated, however, that method 200 may be performed as a semi-continuous or a continuous process.

Figure 3:
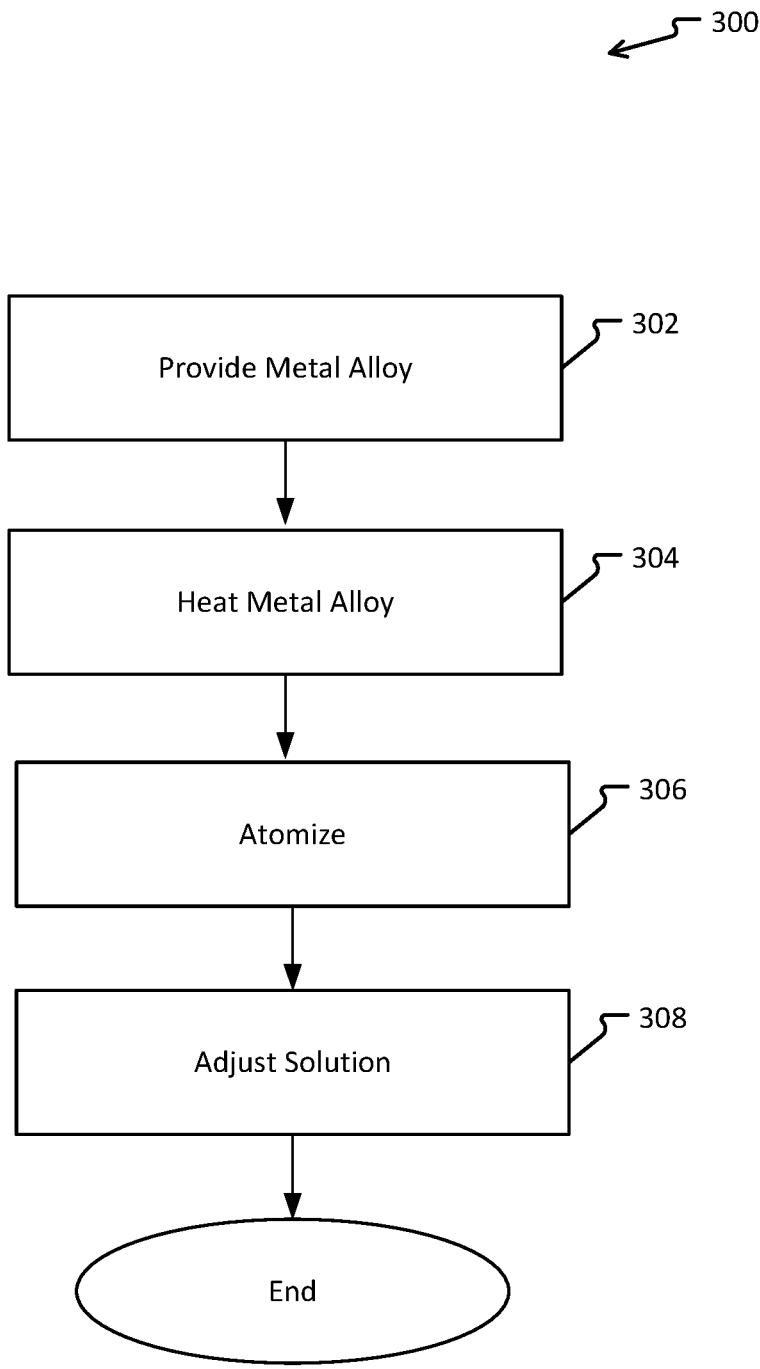
FIG. 3 is a method for atomizing a metal alloy.

FIG. 3 is a method 300 to atomize metal using high-pressure water atomization. Method 300 begins with provide bulk metal operation 302. Bulk metal may come from a variety of sources, such as scrap jewelry, jewelry sweeps, dory bars, gold ores, and electronic scraps. In aspects of the technology, the bulk metal may have a composition as provided in the following table:

| Gold % | Silver % | Copper % | Zinc % | Platinum % | Palladium % |
|---|---|---|---|---|---|
| 24.99 | 10 | 55 | 10 | Trace | Trace |
| 75 | 10 | 10 | 4.99 | Trace | Trace |
| 90 | 5 | 4.99 | 0 | Trace | Trace |

Method 300 then proceeds to melt bulk metal operation 304. In operation 304, the bulk metal may be heated to substantially melt the bulk metal. For example, an induction furnace may be used to heat the metal up to the melting point of the bulk metal where it is capable of flowing. For example, an induction furnace may heat the bulk metal to a temperature of about 1093° C.

Method 300 then proceeds to atomize operation 306. In operation 306, the molten, free-flowing gold is poured into an atomization chamber. In some examples, the atomization chamber comprises one or more streams of high-pressure water. Those high-pressure streams may be directed at the stream of molten metal, such as gold. In aspects of the technology, the high-pressure water is brine water, comprised of 95% water and 5% NaCl by weight. In some examples, the brine solution may be chilled to about −2° C., filtered, and compressed to a high-pressure (about 5,000 Pounds per square inch, in some aspects of the technology). One or more jets may then spray the chilled brine solution on the molten metal to form fine metal particulate solution.

Method 300 then proceeds to brine operation 308. In brine operation 308, the metal particulate solution may be adjusted with additional salt (such as NaCl), water, and/or and acid. Further, one or more reagents, such as hydrochloric acid, may be added. In a particular example, the solution may be adjusted to target a brine comprising 3.5% HCl/4.7% NaCl in water by weight. This solution may be provided to a metal-oxidation system, such as the metal oxidation system described with reference to FIG. 1.

Figure 4:
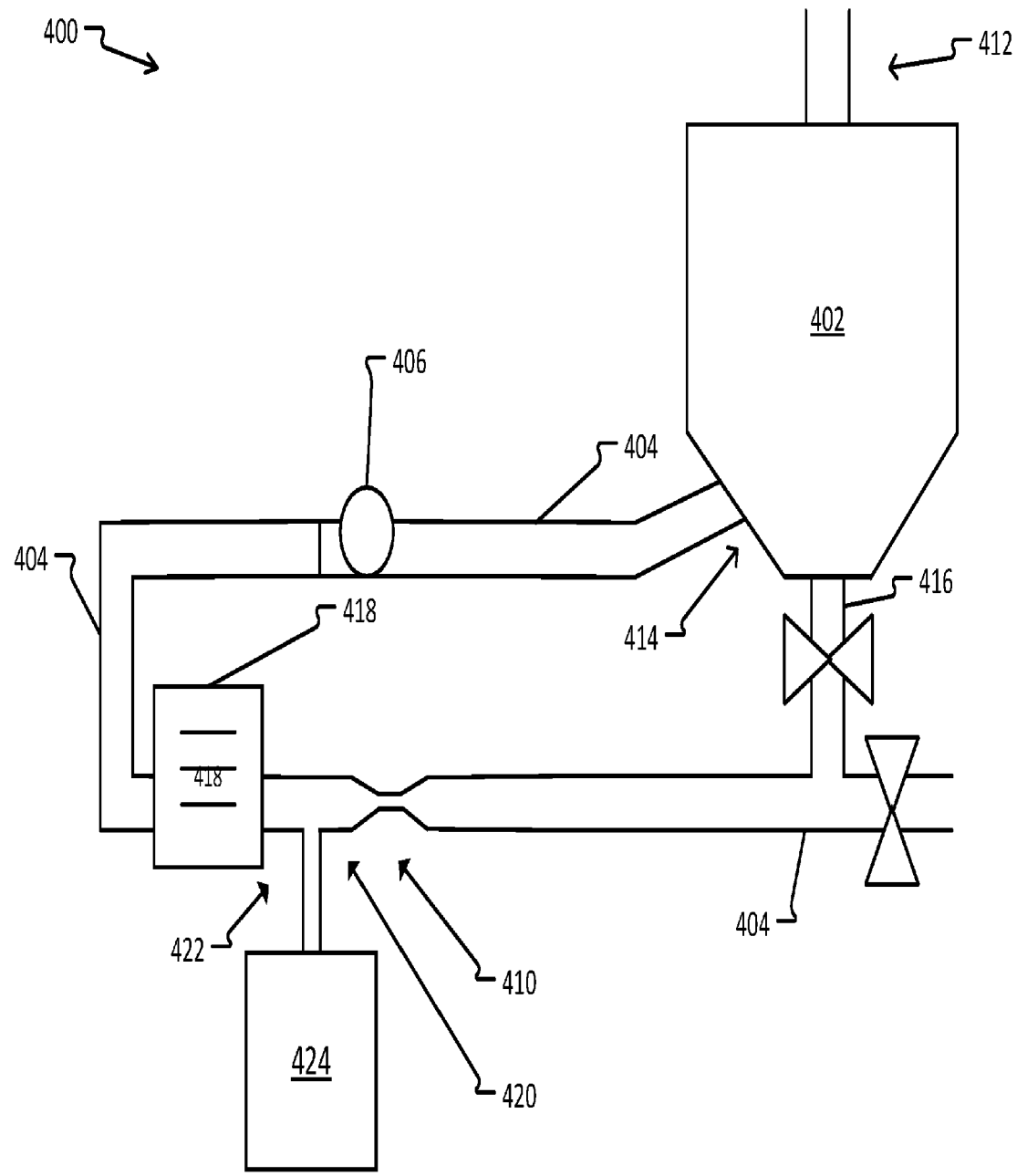
FIG. 4 illustrates an example system for oxidizing or reducing metals in solution.

FIG. 4 illustrates a system 400 for separating metal alloys. As illustrated, FIG. 4 includes a tank 402, a circulation conduit 404 that couples a pump 406, a heat exchanger 418, and a Venturi system 410 to the tank 402 such that each are in fluidic communication.

As illustrated, the tank 402 includes an inlet 412, a side outlet 414, and a bottom inlet/outlet 416 in fluidic communication with the Venturi system 410, pump 406, the heat exchanger 418 via the circulation conduit to circulation conduit 404. Tank inlet 412 may receive various solutions and materials and reagents, such as the HCl, water, brine, or salt, such as NaCl.

A pump 406 may circulate various solutions from the side outlet 414 to the bottom inlet 416 using the circulation conduit 404. The solution may be pumped through a centrifugal pump at 450 gallons per hour.

As illustrated, a heat exchanger 418 and a Venturi 410 are integrated within the circulation conduit 404. The heat exchanger 418 may be a water chiller with feed water of about 5° C. to about 10° C. This may allow a solution passing through the circulation conduit (and/or within the tank 402) to be kept below 38° C.

Proximate to one end 420 of a Venturi 410 is a fluid inlet 422, which is in fluidic communication with a fluid reserve tank 424. The fluid reserve tank 424 may comprise a gas, such as chlorine or sulfur dioxide, or a liquid, such as sodium hydroxide.

The system 400 may additionally include other valves, temperature, pressure, flowrate and other monitors, and other various computerized control systems without departing from the scope of the innovative technologies described herein.

EXAMPLES

In a first example, a metal alloy comprising 50% gold, 7% silver, 36% copper, and 7% zinc was formed from pure elemental metals. The metal alloy was melted by heating the metal in a crucible. The molten metal was poured into an atomizer having high pressure water jets similar to the atomizers described herein. The resulting gold metal alloy powder was passed through a 320 mesh to verify the size of the particles and remove any particles of larger size. The resulting mesh powder was placed into a 900 mL $H_2O$, 100 mL 10% HCl, 50 grams NaCl, 0.5 mL isopropyl alcohol solution. The ratio of mesh powder was 8 oz of mesh powder per liter of the solution. The solution was placed in a reactor system, similar to the reactor system described with reference to FIG. 4. Chlorine gas ($Cl_2$) was pumped into the solution for 50 minutes at a rate of 0.0778 standard cubic feet per minute (scfm) using a Venturi system. At minute 50, a millivolt reading stabilized at 1140, where it did not change for the remaining 10 minutes of the test. This reading indicates that substantially all of the metal was chlorinated.

In a second example, a metal alloy comprising 50% gold, 7% silver, 36% copper, and 7% zinc formed from pure elemental metals via melting. The resulting metal alloy was melted by heating the metal in a crucible. The molten metal was poured into an atomizer having high-pressure water jets similar to the atomizers described herein. The resulting gold metal alloy powder was passed through a 100 to 150 mesh to verify the size of the particles and remove any particles of larger size. The resulting mesh powder was placed into a 900 mL $H_2O$, 100 mL 10% HCl, 50 grams NaCl, 0.5 mL isopropyl alcohol solution. The ratio of mesh powder was 8 oz of mesh powder per liter of the solution. The solution was placed in a reactor system, similar to the reactor system described with reference to FIG. 4. Chlorine gas ($Cl_2$) was pumped into the solution at a rate of 0.0778 standard cubic feet per minute (scfm) using a Venturi system for one hour and five minutes. During that time, a millivolt reading increased from 71 to 467 MV/orp. A millivolt reading read 1117 millivolts at one hour and 10 minutes. This reading indicates that substantially all of the metal was chlorinated.

In a third example, a metal alloy comprising 50% gold, 7% silver, 36% copper, and 7% zinc formed from pure elemental metals via melting. The resulting metal alloy was melted by heating the metal in a crucible. The molten metal was poured into a liquid atomizer having high-pressure water jets similar to the atomizers described herein. The resulting gold metal alloy powder was passed through a 150 to 200 mesh screen to verify the size of the particles and remove any particles of larger size. The resulting mesh powder was placed into a 900 ml $H_2O$, 100 ml HCl, 50 grams NaCl, 0.5 ml isopropyl alcohol solution. The ratio of mesh powder was 8 oz of mesh powder per liter of the solution. The solution was placed in a reactor system, similar to the reactor system described with reference to FIG. 4. A volume of 41.6 cubic feet per minute of $Cl_2$ was pumped into the solution for one hour. During that time, a millivolt reading increased from 330 to 1118 MV/orp, indicating a substantially reacted solution.

Example 2 has seven stages.

Stage 1: Atomization

Gold alloy (comprising 50% gold, 7% silver, 36% copper, 18% zinc) was heated until it forms a flowing melt. The melted gold alloy was fed into an atomizer through a crucible with a hole (3.175 mm) at the bottom of the crucible leading into a tank with high pressure jets. A 5% NaCl solution (at 7° C.) was sprayed into the atomizer tank at high pressure (5,000 psi). When the melted gold drops into the atomizer tank, the gold solidified and was chopped into a fine powder by the action of the high-pressure 5% NaCl solution being sprayed by the spray jet. The powder was collected by filtration and dried. This atomized material was used for the gold dissolving processing in stage two. This system may be computerized.

Stage 2: Converting Gold Metal Alloy to Metal Chloride

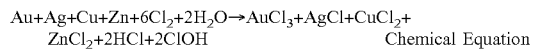

Au+Ag+Cu+Zn+6Cl$_2$+2H$_2$O→AuCl$_3$+AgCl+CuCl$_2$+ZnCl$_2$+2HCl+2ClOH    Chemical Equation To a reaction vessel (equipped with pump, heat exchanger, and Venturi to draw the chlorine gas into the reactor under vacuum, a thermometer, cooling bath and a millivoltmeter) atomized gold metal alloy (256 g, −320 mesh size) was added. The atomized metal alloy scrap metal comprised 50% gold (128.5 g, 0.652 mole); 7% silver (18 g, 0.167 mole); 36% copper (92 g, 1.448 mole) and 7% Zinc (18 g, 0.275 mole). Hydrochloric acid (33%, 100 mL), water (900 mL), sodium chloride (50 g) and isopropyl alcohol (0.5 mL) was added to the reaction vessel before chlorine gas was added using a Venturi system. At the beginning of the reaction, the temperature was 5.5° C. and a cooling bath temperature was 2° C. while the millivoltmeter had a reading of 230 millivolt. Chlorine gas was added to the reaction vessel under vacuum and at a rate of 0.0778 standard cubic feet per minute (scfm) using a Venturi system. This produced hydrochloric acid during processing. After one minute the chlorine gas flow was 0.0778 scfm, the temperature was 5.5° C. and the voltage was 385 millivolts. The reaction color went from colorless to a very light green during the first 5 minute of chlorine gas addition. The reaction mixture was monitored for 30 minutes. When the voltmeter got to a high of 1,140 millivolts and the temperature was 32° C. after 15 minutes, the reaction was completed. The end temperature was 13° C. The ending color was a very dark green. After the 30 minutes time period, the chlorine gas was turned off and hydrogen peroxide was introduced to mitigate any excess chlorine gas that was in the head space of the reactor. At this stage gold chloride, copper chloride, and zinc chloride where in solution while silver chloride precipitated out of solution. This system may be computerized.

Stage 3: Silver Chloride from Silver Chloride Isolation by Filtration

The dark green solution produced in stage 2 was filtered to collect silver chloride precipitate. The silver chloride precipitate was collected by a filtration process. A Buchner funnel with filter paper (0.2 micron) or polypropylene filter was used in the Buchner funnel for the silver chloride filtration process. Once the silver chloride precipitate was isolated in the Buchner funnel, the silver chloride precipitate was washed with water (3×100 mL distilled water) and then dried to a constant weight. The isolated dried silver chloride weight was 22.32 g which is a silver-colored solid (0.5 microns). Inductive coupled plasma (ICP) analysis indicated that the solid was pure silver chloride. The remaining filtrate and washings were combined into a single solution. The solution was diluted with distilled water to meet 1.5 L for the next processing stage of the gold chloride reduction to gold metal. This system may be computerized.

Stage 4: Gold Isolation

3SO$_2$+AuCl$_3$+3H$_2$O→3SO$_3$+6HCl+2Au    Chemical Equation

The filtrate produced in stage 3 (1.5 L of solution), which contained the metal chloride (gold chloride, copper chloride, and zinc chloride), was added to a reaction vessel which was equipped with a pump, heat exchanger, a thermometer, cooling bath, a millivoltmeter and a gas Venturi system. The gold chloride solution was heated to 34° C. and hydrochloric acid was added to reach a 3.5% HCl solution by weight. Isopropyl alcohol (1.0 mL) was added to the solution which is at a temperature of about 34° C. Sulfur dioxide gas is added at a rate of 0.0696 standard cubic feet per minute (scfm) for 30 minutes. During the 30 minutes of sulfur dioxide addition, the color of the solution changed from dark green to a brown-gold color. The temperature increases up to 52° C., and the voltage changed from 755 to 395 millivolts and the gold metal precipitated from the solution. Addition of sulfur dioxide was stopped. Elemental gold precipitated out of solution. This system may be computerized.

Stage 5. Filtration

The resulting gold sponge of stage 4 was isolated using a filtration process. A Buchner funnel was used to filter the gold precipitate. The precipitate filtrate, which was gold sponge, was washed with water (3×300 distilled water) and dried to a constant weight. Inductive coupled plasma (ICP) analysis indicated that the solid was pure gold metal. A total of 128 g (99.6% yield) of gold metal with a purity of 99.9999% as determined by ICP analysis. An in-process sample of the solution was run through the ICP after filtering to determine that we had recovered 100% of the gold. The filtrate and washings were combined and utilized in the next stage for copper and Zinc isolation. This system may be computerized.

Stage 6. Base Metal Precipitation

To a reaction vessel which is equipped with pump, a heat exchange, a thermometer, a gas venturi system and a millivoltmeter was added the filtrate and washing of stage 5, which comprised a solution (4.0 L) of copper oxychloride (171 g) and zinc chloride (18 g). Sodium hydroxide (80 mL of a 50% solution) was added using the Venturi to increase the pH from 1 to 13. The temperature of the solution was maintained at 37° C. At the high pH level, the copper oxychloride and zinc chloride precipitated over 30 minutes. After the 30 minute time period, it was observed that the precipitation was complete. Next, the pH was decreased from 13 to 7 with hydrochloric acid (50 mL, HCl (33%)) reducing the solution to a 5% NaCl solution (water and sodium chloride). This system may be computerized.

Stage 7. Filtration

The remaining solution from stage 6 included copper oxychloride. The copper oxychloride was isolated by filtration at pH 7, washed and dried to constant weight. The combined filtrate which is at pH 7 (water) is utilized for stage two processing. A total of 115.92 g of combined copper oxychloride and zinc chloride is isolated. Inductive coupled plasma (ICP) analysis is utilized for analysis. This system may be computerized.

Example 3, Platinum Chloride and Palladium Chloride

In an additional example, to a reaction vessel which is equipped with a pump, a Venturi system to draw the chlorine gas into the reactor under vacuum, a thermometer, cooling bath, a millivoltmeter was add multiple sets of filtrate (3.5 L) from a first filtrate from a gold isolation. The solution comprised platinum (13.1 g, 67.12 mmol) and palladium (13 g, 123.33 mmol) as chlorides. Ammonium chloride (50 g, 0.934 mol) was added to the reaction vessel along with isopropyl alcohol (1.0 mL). Chlorine gas was added using a Venturi system to the reaction vessel under vacuum and at a rate of 0.0056 standard cubic feet per minute (scfm). At 27° C. both the platinum and palladium metals were converted to their respective chloride derivatives.

The ammonium chloroplatinate precipitates immediately at ambient temperature. After 20 to 30 minutes of stirring, the ammonium chloroplatinate was isolated by filtration. To the filtrate containing palladium chloride was added hydrochloric acid (10 mL), which precipitated palladium chloride. In this example, platinum chloride (17.80 g, 66.919 mmol, 99.7%) and palladium chloride (21.85 g, 123.21 mmol, 99.90%) was isolated. Inductive coupled plasma (ICP) analysis is utilized for analysis. This system may be computerized.

Figure 5:
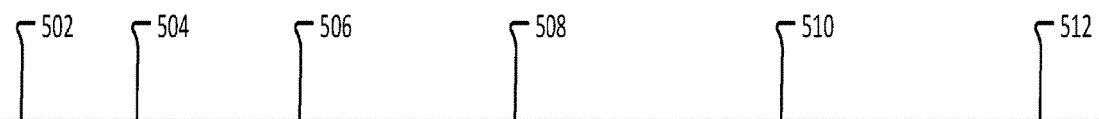
FIG. 5 illustrates a table of example test data for alloy dissolving.

FIG. 5 illustrates a table of example test data for dissolving gold alloys in solution using chlorine gas as an oxidizing agent. As illustrated, FIG. 5 illustrates the difference in time it takes for atomized metal alloys of variant sizes to react fully or substantially fully with chlorine gas. As illustrated, FIG. 5 includes six columns. Column 502 indicates the test number. Column 504 indicates the number of minutes the test was run. Column 506 indicates the liters of solution. Column 508 indicates the cubic feet of chlorine gas that was pumped through the vessel during the test period (at a constant rate). Column 510 indicates the temperatures in degrees Fahrenheit during the start middle and end of the test. Column 512 indicates the mesh size range of the atomized metal alloy. For all of the tests one through five, 900 milliliters of water, 100 milliliters of hydrochloric acid at 37% concentration, 50 grams of NaCl, and 0.5 milliliters of isopropyl alcohol was added to a reactor similar or the same as the reactors described above. The atomized gold alloy comprising 50% gold, 7% silver, 36% copper, and 7% zinc was added to the solution. The total weight of the atomized metallic alloy that was added was 256 grams. As indicated in FIG. 5, test one ran for 90 minutes. During that time 6.1 cubic feet of chlorine gas was diffused into the solution. It took 90 minutes for the millivolt reading to indicate that substantially all of the atomized metal in the metal alloy had formed metal chlorides. It will be appreciated that as the size of the atomized particle decreased the speed which the reaction took place increased. The fastest test was test number 5, in which a metal particle size of about 320 mesh was reacted for 30 minutes with 3.85 cubic feet of chlorine gas bubbled through the solution during the test at a constant rate.

FIG. 6 illustrates a table of example test data for gold precipitation. Among other information, FIG. 6 illustrates the varying effects that different temperatures and surface tension relivers have on gold precipitation. FIG. 6 has 10 columns. Column 602 indicates the test number. Column 604 indicates the number of minutes that the test was run. Column 606 indicates the total cubic feet of sulfur dioxide run through a reactor during the test time. Column 608 indicates the starting and ending temperature in degrees Fahrenheit. Column 610 indicates whether polyvinyl alcohol was added during the test. Column 612 indicates whether 1-butanal was added during the test. Column 614 indicates whether 2-methyl/2-butanol was added during the test. Column 616 indicates whether isopropyl alcohol was added during the test. Column 618 indicates the millivolt measurement prior to the start of the test. Column 620 indicates the millivolt reading after the end of the test period.

For all of the tests illustrated in FIG. 6, 2.5 liters of solution was reacted using the reactor similar to or the same as the reactors described above and then was filtered using the techniques described herein to collect elemental gold. The 2.5 liter solution was derived from a gold alloy comprising 70% gold, 20% copper, 5% platinum, and 5% palladium. The gold alloy was atomized and chlorinated by reacting chlorine gas with an acidic brine solution having the atomized material suspended within said solution. A millivolt reader was applied to the solution to monitor when substantially all of the metals had been chlorinated. The techniques/methods applied were similar or the same as the techniques described with respect to operation 208 above. The resulting solution was passed through a filter to remove elemental gold precipitate. It was observed during tests one through six that the gold precipitate stuck to the lining of the reactor at the low temperature. It was further observed that the gold precipitate stuck to the lining during tests 6, 7, 8 and 9 to a lesser extent. Test number 10 there was no sticking. It will be appreciated from a review of FIG. 6 that a temperature range of between 95 degrees Fahrenheit and 122 degrees Fahrenheit allowed for the fastest reaction time at 22 minutes.

FIG. 7 illustrates a table of example test data for platinum group precipitation. FIG. 7 illustrates the effect of changing temperature on precipitation of platinum and palladium, among other things. FIG. 7 has six columns. Column 702 indicates the test number. Column 704 indicates the number of minutes the test was run. Column 706 indicates the number of cubic feet of chlorine gas that was diffused into the solution during the test period, which was at a constant rate. Column 708 indicates the starting temperature and ending temperature in degrees Fahrenheit. Column 710 indicates the number of grams of ammonium chloroplatinate and the corresponding percentage of platinum recovered. Column 712 indicates the number of grams of ammonium chloroplatinate recovered and the corresponding percentage.

For all of the tests provided in FIG. 7, 256 grams of a gold alloy comprising 70% gold, 20% copper, 5% platinum, and 5% palladium was atomized and chlorinated to form an acidic brine solution using techniques similar to or the same as the techniques described with respect to operation 202 and 204 above. The resulting solution was then filtered to remove any precipitate and was reduced to precipitate out and filter the elemental gold using techniques similar to the same as those techniques described with reference to operation 208 and 210. To that resulting filtrate, a total of 3.5 liters was mixed with 50 milliliters of 50% ammonium chloride and one milliliter of isopropyl alcohol. The solution was monitored from a starting pre-precipitation voltage of 800 millivolts to an ending post precipitation millivolt of 650 millivolts. This indicates that the reaction was substantially complete. During the test, the resulting solution was subjected to the indicated cubic feet of chlorine gas as indicated in column 706. It will be appreciated that test #6 completed in the shortest amount of time. Additionally test #6 had the highest percentage of both platinum and palladium recovered, each as a chloride.

FIG. 8 illustrates a table of example test data for precipitating copper oxychloride. FIG. 8 illustrates the effect of varying temperature on the precipitation time of copper oxychloride. FIG. 8 has six columns. Column 802 indicates the test number. Column 804 indicates the number of minutes of the test. Column 806 indicates the starting liters of solution. Column number 808 indicates the starting and ending temperature in degrees Fahrenheit. Column number 810 indicates the total amount of sodium hydroxide in grams at 50% concentration that was added to the solution. Column 812 indicates the total amount of copper oxychloride recovered in grams and as a percentage of the starting copper.

For each of the tests one through six indicated in FIG. 8, the four liter solution comprising an amount of copper chloride to produce a total amount of 176 grams of copper oxychloride at full reaction was provided to a reactor. In each of the tests, 40 grams of sodium hydroxide at a concentration of 50% was added to the starting solution. The starting solution had a pH of around 1 to 0. After the addition of the sodium hydroxide, the pH of the solution was about 13. Once precipitation was substantially complete, as evident by a millivolt reading going from 650 millivolts to 250 millivolts, 50 milliliters of 37% strength hydrochloric acid was added. This lowered the pH to about 7. It will be appreciated that test #1, having a temperature of about 80 degrees Fahrenheit throughout the test, resulted in the fastest precipitation. Additionally, test #1 provided the highest percent recovery of copper as copper oxychloride.

While aspects of the technology were discussed in relation to gold, it will be appreciated that the technologies described herein may be employed to separate metal allows comprising one or more of: all non-ferrous metals and rear earth metals including Aluminum, Magnesium, Titanium, Beryllium, Copper, Zinc, Lead, Tin, Tungsten, Nickel, Molybdenum, Chromium, Gold, Silver, Platinum, palladium, etc.

Further, while various embodiments have been described for purposes of this disclosure, various changes and modifications may be made which are well within the scope of the disclosed methods. Numerous other changes may be made which will readily suggest themselves to those skilled in the art and which are encompassed in the spirit of the disclosure.

I claim:

1. A method for refining metal comprising:
providing a powdered metal comprising one or more non-ferrous metals, wherein the one or more non-ferrous metals includes a base metal;
mixing the powdered metal with a brine solution to form a brine solution suspended with metallic particulates;
mixing the brine solution suspended with metallic particulates with an acid to form an acidic brine solution suspended with the metallic particulates;
chlorinating the acidic solution suspended with the metallic particulates to form a chlorinated brine solution suspended with reaction products;
filtering out the reaction products to form a filtered-chlorinated brine solution;
reducing the filtered-chlorinated brine solution to form a platinum-group precipitate and a second solution;
filtering out the platinum-group precipitate to form a base metal solution;
reducing the base metal solution to form a base metal precipitate comprised of the base metal and a water-chloride solution;
filtering out the base metal precipitate to form a filtered water-chloride solution.

2. The method of claim 1, wherein the brine solution comprises 5% sodium chloride by weight.

3. The method of claim 1, wherein the platinum-group precipitate is ammonium chloroplatinate.

4. The method of claim 1, wherein the base metal precipitate comprises non-ferrous chlorides.

5. The method of claim 1, wherein the temperature of each of the brine solution, the acidic brine solution, the chlorinated brine solution, and the chlorinated brine solution, the filtered-chlorinated brine solution, the second solution, the water-chloride solution, and the filtered water-chloride solution is kept below 100° C.

6. The method of claim 1, wherein the acidic brine solution suspended with atomized metallic particulates comprises about 3.5% hydrochloric acid, about 4.7% sodium chloride, and about 91.8% water by weight.

* * * * *